United States Patent [19]

Wakabayashi et al.

[11] Patent Number: 5,663,601
[45] Date of Patent: Sep. 2, 1997

[54] CORE WINDING SET FOR A MOTOR

[75] Inventors: Shinichi Wakabayashi; Susumu Kobayashi, both of Komagane; Mithugi Ookubo; Ethuji Yamashita, both of Nagano, all of Japan

[73] Assignees: Sankyo Seiki Mfg. Co., Ltd.; Nagano Drilube Co., Ltd., both of Japan

[21] Appl. No.: 48,367

[22] Filed: Apr. 15, 1993

(Under 37 CFR 1.47)

[30] Foreign Application Priority Data

Apr. 20, 1992 [JP] Japan ..................... 4-126910

[51] Int. Cl.⁶ .................. H02K 15/12; H02K 3/30
[52] U.S. Cl. .................. 310/45; 310/216; 310/194; 310/179
[58] Field of Search ............. 310/45, 215, 40 MM, 310/42, 216, 179, 194; 336/199, 206

[56] References Cited

U.S. PATENT DOCUMENTS

| | | |
|---|---|---|
| 4,615,106 | 10/1986 | Grimes et al. ................ 29/605 |
| 4,896,065 | 1/1990 | Tsuyama ..................... 310/154 |
| 5,314,984 | 5/1994 | Markovitz et al. ............. 528/117 |
| 5,374,810 | 12/1994 | Gantt ........................ 29/670 |

FOREIGN PATENT DOCUMENTS

| | | |
|---|---|---|
| 2223355 | 2/1988 | Japan . |
| 1278242 | 4/1988 | Japan . |
| 1278243 | 4/1988 | Japan . |
| 2179233 | 12/1988 | Japan . |
| 2276449 | 4/1989 | Japan . |
| 326249 | 7/1989 | Japan . |

*Primary Examiner*—Steven L. Stephan
*Assistant Examiner*—Judson H. Jones
*Attorney, Agent, or Firm*—McAulay Fisher Nissen Goldberg & Kiel, LLP

[57] ABSTRACT

A core winding set for a motor has a core with a plurality of salient poles, an insulation layer formed on a surface of the core and a winding wound around each of the salient poles. The insulation layer is formed by applying a liquid insulating agent. The insulating layer may be formed by laminating at least two types of liquid insulating materials on a surface of the core.

18 Claims, 3 Drawing Sheets

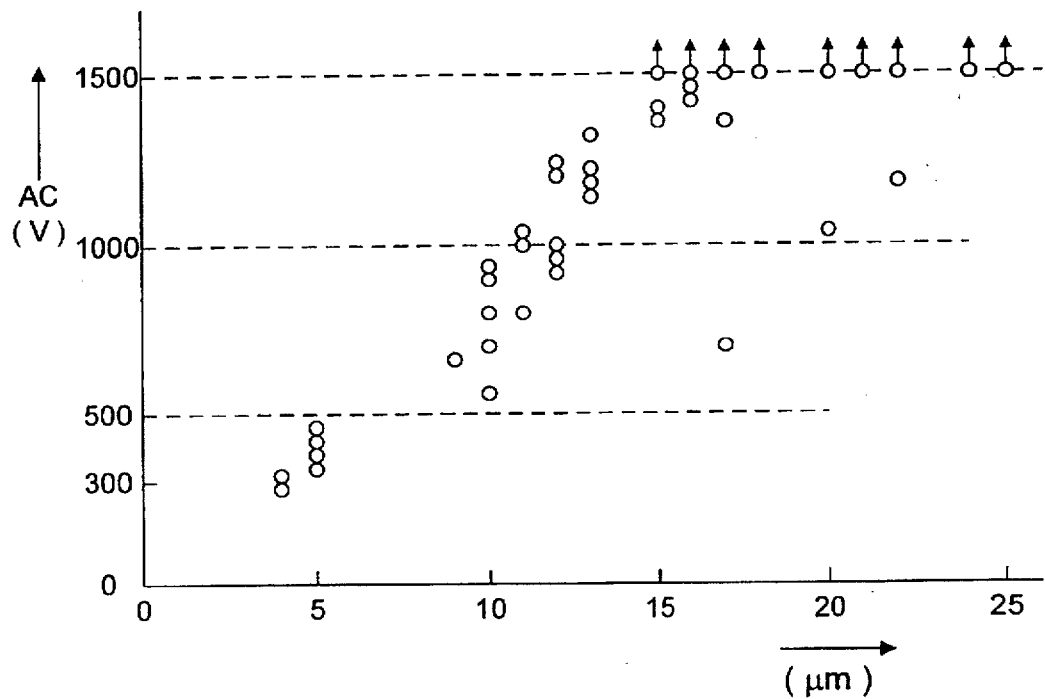
FIG. 3
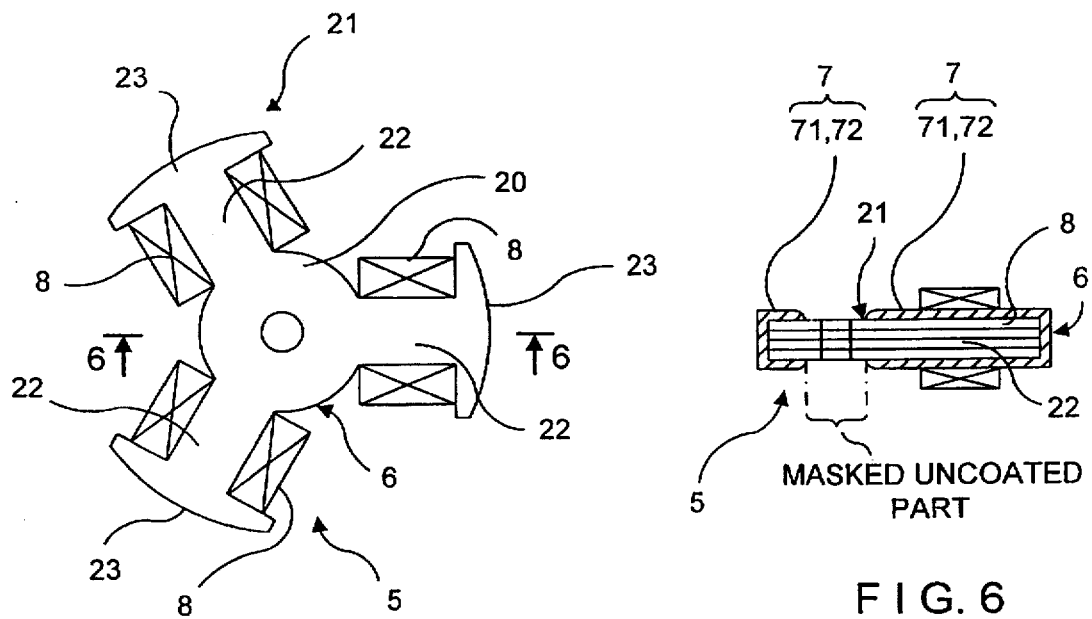
FIG. 5
FIG. 6

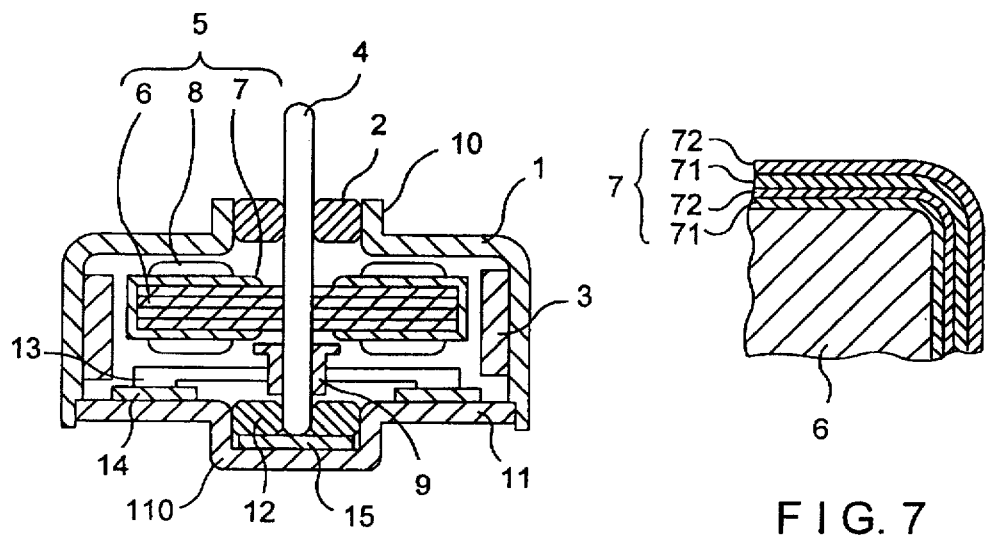
FIG. 4
FIG. 7
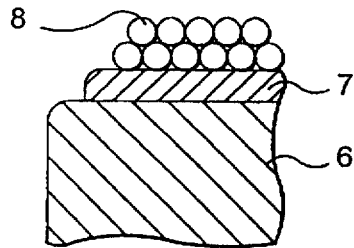
FIG. 8
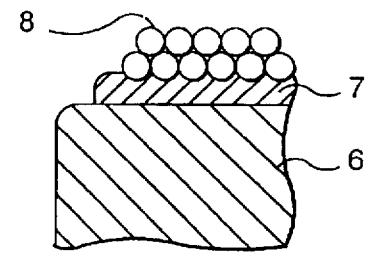
FIG. 9
| | COMPOSITION | A | B | C |
|---|---|---|---|---|
| RESIN | SPECIAL SILICATE MODIFIED POLYETHER RESIN | O | / | / |
| | SPECIAL SILICATE MODIFIED ACRYLIC RESIN | / | O | / |
| | POLYETHER - BASED RESIN | / | / | O |
| SOLVENT | HYDROCARBON-BASED SOLVENT | / | O | O |
| | ALCOHOLS | O | O | O |
| | ESTERS | / | O | O |
| | ETHERS | O | / | O |
| | KETONES | O | / | / |
FIG. 10

CORE WINDING SET FOR A MOTOR

FIELD OF THE INVENTION

The present invention relates to a core winding set for a motor and, more particularly, to the structure of an insulation layer formed on the surface of a core.

DESCRIPTION OF DESCRIPTION RELATED ART

FIG. 4 shows the structure of a small-sized DC motor with a brush.

In FIG. 4, numeral 1 designates a stator case shaped like a cylinder having a bottom. A cylindrical portion 10 is formed at the center of the portion of the stator case 1 which constitutes the bottom portion thereof, the cylindrical portion 10 penetrating through the bottom portion.

A metal bearing 2 is press-fit to the inner circumference of the cylindrical portion 10.

A side plate 11 is fixed to the open end of the stator case 1 (shown in the lower part in the figure), and a cylindrical portion 110 is formed at the center of the side plate 11 so that it outwardly projects in a shape like a bag.

A thrust pad 15 constituted by resin or a washer is fixed to the inner (the side of the stator case 1) bottom of the cylindrical portion 110. Further, a metal bearing 12 is press-fit to the inner circumference of the cylindrical portion 110.

Therefore, the thrust pad 15 is sandwiched by the inner bottom of the cylindrical portion 110 and the bearing 12. The bearings 2 and 12 rotatably support a rotational axis 4. A core winding set 5 comprising a rotor core 6, an insulation layer 7 and windings 8 is fixed to the rotational axis 4. A ring-shaped driving magnet 3 is fixed in a position of the inner circumferential surface of the stator case 1 facing the outer circumferential surface of the rotor core 6 with a predetermined gap therebetween.

A rectifier 9 is secured to the rotational axis 4 between the rotor core 6 and the bearing 12, and the tip of a brush 13 slidingly contacts the circumferential surface of the rectifier 9.

A base portion of the brush 13 is supported by a brush holder 14 fixed to the side plate 11.

FIG. 5 shows the core winding set 5 fixed to the rotational axis 4.

In the core winding set 5 comprising the rotor core 6, the insulation layer 7, and the windings 8, the rotor core 6 has a ring-shaped ring portion 20 formed at the center thereof from which a plurality of salient poles 21 (three pieces in FIG. 4) are radially formed.

Further, each salient pole 21 has an umbrella portion 23 whose tip spreads in the shape of a partial arc, and a rib portion 22 which is smaller in width than the umbrella portion 23 is formed between the umbrella portion 23 and the ring portion 20.

The winding 8 is wound a predetermined number of times around the rib portion 22 of each salient pole 21.

The rotor core 6 is normally formed of a thin plate made of a magnetic material, and the core winding set 5 of the motor is constructed by laminating a plurality of the rotor cores 6.

In order to prevent the function of the motor from being disabled (e.g., the motor is not driven by shorting of the windings 8 through the rotor core 6), insulation is provided between the surface of each salient pole 21 (especially, the surface of the rib portion 22 around which the winding 8 is wound) and the winding 8.

Although each winding 8 has an insulation film formed on the surface thereof, cracks may be produced on the insulation film due to the windings 8 scraping each other or by changes in temperature during a period when the motor is being driven or is stopped, resulting in risk of poor insulation.

In order to avoid such poor insulation, it is therefore necessary to form the insulation layer 7 on the surface of each salient pole 21 as described above, thereby improving the safety.

One of the means for providing the insulation between the salient poles 21 and the windings 8 is byway of a means for forming an insulation layer on the surface of the rotor core 6 including the salient poles 21.

The insulation layer 7 has been conventionally formed on the surface of the rotor core 6 by spraying powdery insulating plastic (e.g., epoxy resin powder) on the surface of the rotor core 6 and by performing a heat treatment thereon.

The method wherein powdery insulating plastic (coating material) is applied to the surface of the rotor core 6 (a surface to be coated of an object to be coated) is referred to as powder coating, and this method is for making a coating film by causing a powdery coating material to electrostatically adhere to the surface of the rotor core 6 and by baking it by way of high frequency heating.

PROBLEMS TO BE SOLVE BY THE INVENTION

When the insulation layer on the surface of the rotor core is formed by performing powder coating using the powdery insulating plastic as described above, the insulation layer has a coating thickness of about 0.3 mm which has hindered efforts toward making a motor thinner.

Especially in motors such as those required for floppy disk drives which are strictly required to be thin, the coating thickness of an insulation layer as large as 0.3 mm is a critical thickness in making such motors thin.

Bubbles are generated in an insulation layer thus formed, exposing the surface of the rotor core and thereby causing poor insulation or generating rust.

Especially in the case where an insulation layer as thick as 0.3 mm is formed at one time as in the prior art, bubbles are more apt to appear.

Further, the hardness of an insulation layer formed of powdery insulating plastic is low (It is soft. The hardness is on the order of H to 2 H in the prior art.). When a winding is wound around each of the salient poles of a rotor core having an insulation layer formed thereon, the winding 8 cuts into the insulation layer 7 as shown in FIG. 9. As a result, the insulation layer 7 which has been formed as a motor does not attain the necessary voltage to withstand breakdown (withstand voltage) and thus causes poor insulation.

Considering the demand for a thinner and smaller motor, the winding 8 is aligned as shown in FIG. 8, i.e., the winding 8 is wound without gaps and overlaps to maintain a predetermined number of turns in a small space. However, since the insulation layer 7 is low in hardness, i.e., it is soft, the winding 8 cuts into the insulation layer 7 as shown in FIG. 9, making it difficult to wind it while aligning it properly. This makes it difficult to maintain the predetermined number of turns, creating another problem in that a predetermined motor torque can not be obtained.

Hardness of coating films is defined by JIS and will not be described here in detail. It is briefly summarized as follows.

A coating film is scratched with a pencil named UNI (product name) from Mitsubishi Enpitsu K.K. with a predetermined pressure applied thereto, and the hardness is determined by measuring the size (depth) of the scratch. The hardness is classified as H, 2 H, and so on in the order of increasing hardness.

In addition, powdery insulating plastic does not easily adhere to an edge portion of a rotor core, and, even if it adheres thereto, it is easily thrown off. This reduces the thickness of the insulation layer formed on the edge portion, thereby deteriorating insulating effect.

OBJECTS AND SUMMARY OF THE INVENTION

The present invention is intended to solve such problems, and it is an object of the present invention to provide a core winding set for a motor wherein an improvement has been made in the configuration of an insulation layer formed on the surface of a core for making the thickness of the insulation layer much thinner than that of a conventional insulation layer formed by spraying powdery insulating plastic, thereby making a motor thinner.

It is an object of the present invention to provide a core winding set for a motor wherein reduction in the thickness of the insulation layer at an edge portion of a motor core can be avoided to maintain sufficient insulation for the edge portion at which insulating effect otherwise tends to deteriorate.

It is another object of the present invention to provide a core winding set for a motor wherein an insulation layer which is higher in hardness (harder) than that found in the prior art is provided to solve the problem that windings cut into the insulation layer, allowing a predetermined number of turns to be maintained and a predetermined motor torque to be obtained with a thin and small configuration.

In accordance with the invention, a core winding set for a motor comprises a core having a plurality of salient poles, an insulation layer formed on a surface of the core, and a winding wound around each of the salient poles on which the insulation layer is formed, the insulation layer being formed by applying a liquid insulating agent.

For a better understanding of the present invention, reference is made to the following description and accompanying drawings while the scope of the invention will be pointed out in the appended claims.

BRIEF DESCRIPTION OF THE DRAWINGS

FIG. 3 is a graph showing the relationship between the coating thickness of a primer usable as a first layer insulating agent in the above embodiment and the withstand voltage of ceramic.

FIG. 4 is a sectional view showing an embodiment of a small-sized motor.

FIG. 5 is a plan view showing an embodiment of a core winding set for a motor.

FIG. 6 is a sectional view of the core winding set for a motor in FIG. 5 taken along the line A—A.

FIG. 7 is a sectional view showing how an insulation layer according to the present invention is formed in a multiplicity of layers.

FIG. 8 is a sectional view showing the state of an insulation layer formed on the surface of a core around which a winding is wound at random.

FIG. 9 is a sectional view showing a state wherein a winding is wound in proper alignment on an insulation layer formed on the surface of a core.

DESCRIPTION OF THE PREFERRED EMBODIMENTS

Figures 1A, 1B, 1C, 1D:
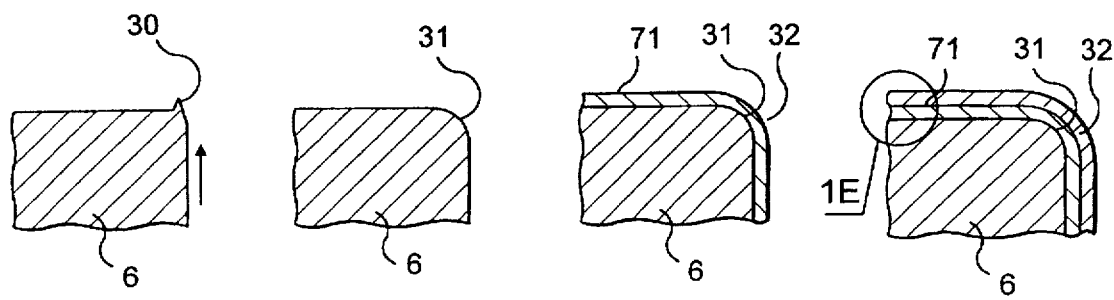
FIG. 1a–1e are sectional views showing major parts of an embodiment of a core winding set for a motor according to the present invention in the order of the stages of processing thereof.

An embodiment of a core winding set for a motor according to the present invention will now be described with reference to the drawings. Since there is no special limitation on the shape of a core to which the core winding set for a motor according to the present invention is applied, the following description will take the rotor core which has already been explained with reference to FIG. 5 as an example.

Although a core winding set 5 for a motor according to the present invention is configured as a rotor portion of a motor, it may also be configured as a stator portion of a motor.

In addition, it is not limited to a small-sized motor with a brush but can be a core winding set used in a brushless motor.

As shown in FIG. 4 to FIG. 6, the core winding set 5 comprises a rotor core 6, insulation layer 7 and windings 8.

The rotor core 6 can be obtained by laminating a plurality of core elements which are plate members made of a magnetic material (e.g., magnetic steel sheets) stamped using a press process.

The rotor core 6 has a configuration wherein a ring shaped ring portion 20 is formed at the center thereof, and a plurality of salient poles (three pieces in FIG. 4) are radially formed from the ring portion 20.

Further, each salient pole 21 has an umbrella portion 23 whose tip spreads in the shape of a partial arc, and a rib portion 22 which is smaller in width than the umbrella portion 23 is formed between the umbrella portion 23 and the ring portion 20.

A winding 8 is wound a predetermined number of times around the rib portion 22 of each salient pole 21.

The insulation layer 7 is formed on the surface of the rotor core 6, and the present invention is characterized by the configuration of the insulation layer 7.

Since the rotor core 6 is obtained by laminating a plurality of core elements which are plate members made of a magnetic material (e.g., magnetic steel sheets) stamped using a press process as described above, when the direction of the stamping is as indicated by the arrow shown in FIG. 1(a), a burr 30 as shown in FIG. 1(a) is produced at the edge portion on the rear side, as viewed in the direction of the stamping, of the laminated rotor core 6.

With the burr 30, when the winding 8 is wound around each salient pole 21 of the rotor core 6, the winding 8 contacts the burr 30 which is present at the edge portion of the salient pole 21 and is scraped thereby during the winding operation. This can cause the winding 8 to be cut or cause the insulation layer on the winding 8 to come off and contact other windings 8 or the surface of the rotor core 6 resulting in shorting.

Considering the above-described situation, the laminated rotor core 6 is treated to remove the area of the burr 30 by means of a sand blasting process wherein grinding is performed with fine particles such as iron powder sprayed while edge portion 31 is chamfered (see FIG. 1(b)).

The sand blasting process in this instance uses reduced iron powder #100.

Further, the rust on the surface of the rotor core 6 is removed in the sand blasting process.

Next, a first insulation layer 71 is formed on the surface of the rotor core 6 as shown in FIG. 1(c).

The first insulation layer 71 is formed by spraying liquid insulating agent α on the entire surface of the rotor core 6, leaving the insulating agent α sprayed until the coating thickness thereof becomes uniform and by performing preliminary baking thereafter.

The first insulation layer 71 is an under coat agent, i.e., a primer.

The preliminary baking is a drying process performed for a predetermined period of time with the temperature maintained at about 120 to 150 degrees.

The above-described conditions are only illustrative and not limiting to the present invention.

Although the liquid insulating agent α can be applied thin, if an attempt is made to apply it too thin, it is difficult to apply the liquid insulating agent α to the edge portion 31 due to surface tension of the liquid insulating agent α and, as shown in FIG. 1(c), the thickness of an edge portion 32 of a first insulation layer 71 formed on the edge portion 31 is smaller than that of other flat portions.

Although the formation of the first insulation layer 71 makes the coating thickness in the area of the edge portion 31 of the rotor 6 small, the edge portion 32 of the insulation layer 71 is formed to have a large radius of curvature.

The liquid insulating agent α is applied once or a plural number of times within a limit of thickness such that no bubble will be generated.

Figure 1E:
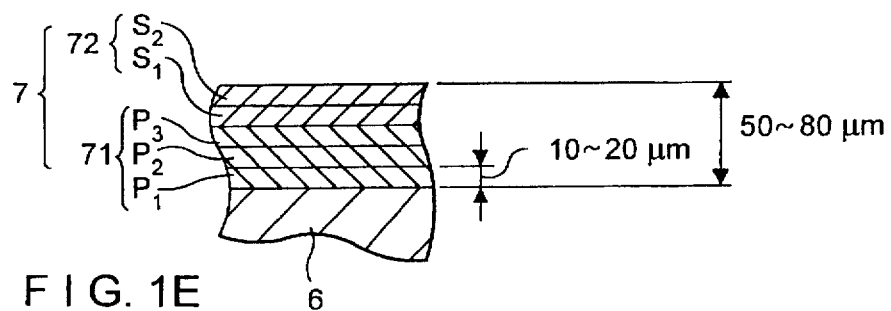

In the present embodiment, the application is carried out three times ($P_1$ to $P_3$) as shown in FIG. 1(e); (FIG. 1(e) is an enlarged view of the portion indicated by A in FIG. 1(d)).

Specifically, the liquid insulating agent α is susceptible to bubbles as described above when applied thickly at one time. On the other hand, if it is applied thin many times, bubbles will not be generated but there will be a concern about the problem of surface tension and efficiency will be reduced. For this reason, in the present embodiment, each cycle of application is carried out within a limit of thickness such that no that no bubble is generated, i.e., thickness on the order of 10 to 20 μm, and the application is repeated a plurality of times to form the first insulation layer 71.

The number of the reapplying operations varies depending on the specification of motors because the application is carried out to a thickness of insulation layer such that a predetermined withstand voltage is obtained.

Next, a second insulation layer 72 is formed on the first insulation layer 71 as shown in FIG. 1(d).

The method of formation is similar to that for the first insulation layer 71. The second insulation layer 72 is formed by spraying the liquid insulating agent β on the entire surface of the rotor core 5 (on the first insulation layer 71), leaving the insulating agent β thus sprayed until the coating thickness thereof becomes uniform, and performing final baking thereafter.

The second insulation layer is the so-called over coat agent.

The final baking is a drying process for a predetermined period of time with the temperature maintained at about 180 degrees.

The above-described conditions are only illustrative and are not limiting the present invention. This process is different from the preliminary baking in the temperature used.

As described above, the first insulation layer 71 is referred to as a primer and acts as a substrate for the application of the second insulation layer 72, i.e., an over coat agent.

If the first insulation layer 71 is not formed and the second insulation layer 72, i.e., the over coat agent, is directly applied to the surface of the rotor core 6 instead, it is difficult to form the insulation layer 7 because it is repelled by the surface tension produced (due to the components therein).

Further, if the second insulation layer 72 is formed on the edge portion 31 whose radius of curvature has been increased as a result of the application of the first insulation layer 71, the liquid insulating agent β is less susceptible to surface tension and the insulating agent β can be substantially uniformly applied to the edge portion 31 having a large radius of curvature.

Therefore, the thickness of the edge portion 32 of the insulation layer 72 applied to the edge portion 31 can be made large enough to maintain predetermined insulating performance.

Like the liquid insulating agent α, the liquid insulating agent β is applied once or a plurality of times within a limit of thickness such that no bubble will be generated as shown in FIG. 1(e).

In the present embodiment, the application is carried out twice ($S_1$ and $S_2$).

The liquid insulating agent β is also susceptible to bubbles as described above when applied thickly at one time. On the other hand, if it is applied thinly many times, bubbles will not be generated but there will be a concern about the problem of surface tension and efficiency will be reduced. For this reason, in the present embodiment, each application is carried out within a limit of thickness such that no bubble is generated, i.e., thickness on the order of 10 to 20 μm, and the application is repeated a plural number of times to form the second insulation layer 72.

The number of the reapplying operations varies depending on the specification of motors because the application is carried out to a thickness of insulation layer such that a predetermined withstand voltage is obtained.

On the other hand, the second insulation layer 72, i.e., the so-called over coat agent is higher in insulation performance and harder compared to the first insulation layer 71.

Further, the surface of the second insulation layer 72 is smoother (more slippery) than that of the conventional insulation layer formed by spraying powdery insulating plastic (which is coarse).

The hardness of the second insulation layer 72 is higher (the hardness is on the order of 7 H) than that of the conventional insulation layer (whose hardness is on the order of H or 2 H).

Therefore, when a winding is wound around the second insulation layer 72, it will not cut into the insulation layer 72, and the possibility of poor insulation will be thus eliminated (see FIG. 8).

In addition, the surface of the insulation layer 72 is relatively smooth (slippery), when a winding 8 is wound, it can be easily moved to a position next to the preceding winding 8. Accordingly, the windings 8 can be easily aligned during winding.

The hardness of the second insulation layer 72 is on the order of 7 H in the present embodiment but it is not limited thereto. Any degree of hardness is acceptable as long as it prevents the windings 8 wound around the insulation layer 7 from cutting into the layer.

The windings 8 are not necessarily wound around the surface of the rotor core 6 with a constant fastening force. The fastening force varies depending on the specification of motors and the types of windings and, therefore, the hardness of the insulation layer is requested accordingly.

In the present embodiment, the insulation layer is formed using the spray coating method wherein compressed air is sent to a spray gun to eject the liquid insulating agent α (or the liquid insulating agent β) together with the air, thereby atomizing the liquid insulating agent α (or the liquid insulating agent β) and spraying it on the entire surface of the rotor core 6. However, other coating methods may be used.

Specifically, major methods for applying a coating material to the surface of a core are electrostatic coating, electrode position coating, and spray coating. The liquid insulating agents α and β may be laminated on the surface of a rotor core using such methods to form a predetermined insulation layer.

Each of the above-described coating methods has both advantages and disadvantages. It may be contemplated to form a predetermined insulation layer through a combination of these coating methods while making use of their advantages.

For example, in the electrode position coating, an object to be coated is dipped in a solution (example: aqueous solution) of a coating material; energization is carried out between the object to be coated acting as an electrode and an auxiliary electrode; the resulting ionized resin is concentrated on the pole having the opposite charge; and it loses its charge there to be deposited. In other words, this method is similar to electrolytic plating in that a coating film is generated on the surface of an object to be coated. It has advantages in that the coating film is uniform and in that there will be no surface left uncoated and has disadvantages in that it is not possible to perform more than one cycle of application (to perform laminate-coating) and that the hardness of the coating film is low.

The motor core according to the present invention will now be described. Although the insulation layer can be uniformly formed on the entire surface of the core even if the core is composed of many layers, it is not possible to reapply the insulation layer or to laminate two types of insulation layers because more than one cycle of application can not be performed. This may cause poor insulation when bubbles are generated.

Further, since the hardness of the insulation layer is on the order of H to 2 H, there remains the problem that the windings cut into the insulation layer making it difficult to wind the windings in proper alignment due to the softness of the insulation layer.

Considering such a situation, the first insulation layer 71 (primer) or the insulation layer of the first insulation layer 71 formed in the first cycle ($P_1$ in FIG. 1(e)) may be formed using the electrode position coating and, thereafter, the second insulation layer 72 (over coat agent) or the insulation layer formed in the second cycle over the first insulation layer 71 ($P_2$ and thereafter in FIG. 1(e)) may be formed using the spray coating.

The electrostatic coating is a method wherein a high voltage electrostatic field is created when a coating materials is atomized through centrifugal atomization or the like to charge the particles of the coating material with an object to be coated grounded, so that the particles of the coating material thus charged adhere to the object to be coated due to electrostatic attraction, forming a coating film thereon.

The electrostatic coating and spray coating are methods wherein a coating material is atomized, and the electrode position is a method wherein a coating material is dissolved in a solution (example: aqueous solution).

Specific examples of the first and second insulation layers 71 and 72 will now be described.

The liquid insulating agent α as the first insulation layer 71 may be a resin-based coating material. For example, an epoxy-resin-based coating material (which is gray in color) is used in the present embodiment.

An example of the composition of an epoxy-resin-based coating material usable as the liquid insulating agent α is as follows:

1) epoxy resin
2) preservative extender pigment (such as calcium carbonate)
3) color pigment (such as titanium)
4) aromatic solvent
5) alcoholic solvent
6) ketones solvent The liquid insulating agent β as the second insulation layer 72 may be, for example, a ceramic coating material (which is transparent).

Table 1 shows the composition of three types of ceramic coating materials A, B, and C which can be used as the liquid insulating agent β.

Coating thickness on the order of 50 to 80 μm of the combined first and second insulation layers 71 and 72 in the described embodiment will provide sufficient insulation resistance and a withstand voltage equivalent to those of the conventional insulation layer as described earlier which is applied by spraying powdery insulating plastic. The thickness can be made much smaller than that of the conventional insulation layer applied by spraying powdery insulating plastic. Accordingly, a core winding set for a motor can be made thinner and, hence, the motor can be made thinner.

Although the acceptable withstand voltage depends on the sizes and purposes of motors, it is AC 250 V for 1 second with a leakage current of 0.5 my for a general small sized motor as described in the present embodiment.

Figure 2:
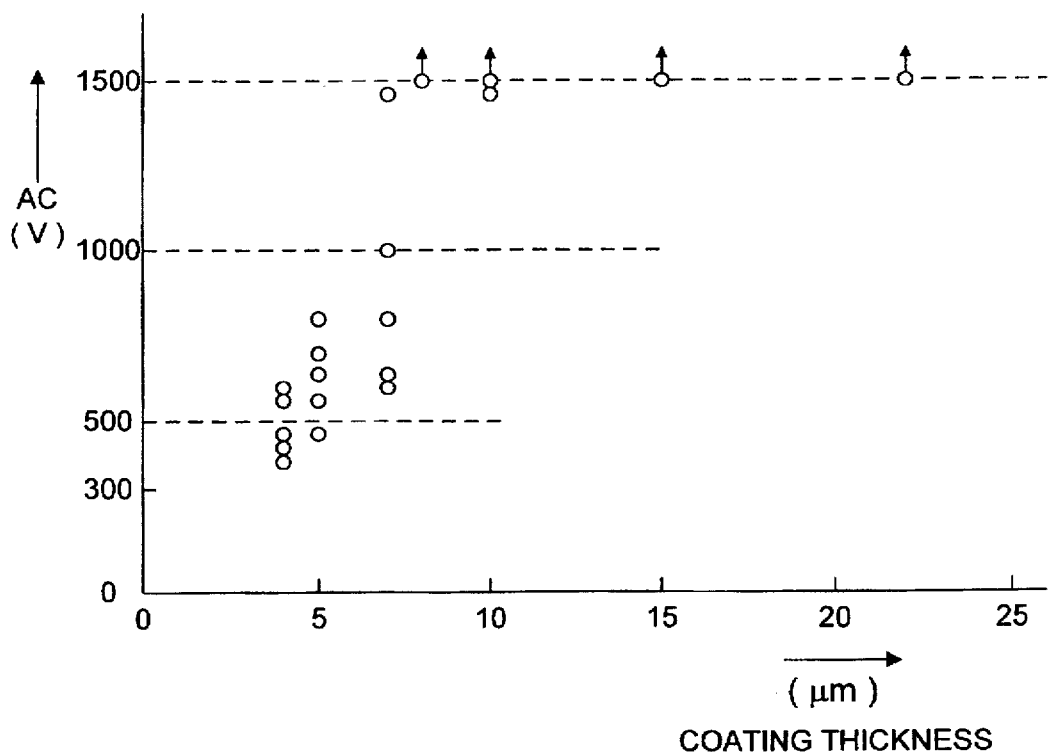
FIG. 2 is a graph showing the relationship between the coating thickness of a ceramic coating material usable as a second layer insulating agent in the above embodiment and a withstand voltage.

FIG. 2 and FIG. 3 show the withstand voltage of a ceramic coating material which is the insulating agent β for the second layer and the withstand voltage of an epoxy-resin-based primer which is the insulating agent α for the first layer, respectively. In either of the figures, the abscissa represents coating thickness (at the surface of the rotor core excluding the edge portion) and the axis of ordinate represents AC application voltages, and limits to which the coating materials can withstand for 1 second with a leakage current of 0.5 MA are indicated by the circles.

As is apparent from FIG. 2 and FIG. 3, predetermined withstand voltages can be obtained for both of the ceramic coating material and the epoxy-resin-based primer even if the coating thickness is quite small. However, since coating thickness tends to decrease at the edge portion 31 of the rotor core 6 as described above, the coating thickness of a multi-layered coat is preferably on the order of 50 to 80 μm as described above including some margin.

According to the above-described embodiment, the insulation layer 7 (first and second insulation layers 71 and 72) on the surface of the rotor core is formed by applying the liquid insulating agents. The coating thickness can be made much smaller than that of the conventional insulation layer applied by spraying powdery insulating plastic. This allows the core winding set for a motor and, in addition, a motor to be made thinner.

Further, since the insulation layer is formed on the rotor core 6 around which the windings are wound by applying the liquid insulating agent once or reapplying it a plurality of times within a limit of thickness such that no bubble will be generated. As a result, the first cycle of coating increases the radius of curvature of the edge portion of the core. When the second coating is carried out, the edge portion 31 whose radius of curvature has thus been increased is less susceptible to surface tension and can be more easily uniformly applied with the liquid insulating agent sprayed in the second cycle. This makes it possible to prevent the coating thickness of the second liquid insulating agent at the edge portion from becoming small, thereby allowing sufficient insulation to be maintained at the edge portion 31 where the insulating effect otherwise tends to deteriorate.

The same is true for the formation of the insulation layer using two types of liquid insulating agents. For example, an epoxy-resin-based primer is applied to the surface of the rotor core 6 around which the windings are wound as the first insulation layer 71, and, for example, a ceramic coating material is further applied as the second insulating layer 72. As a result, the application of the first insulation layer 71 increases the radius of curvature of the edge portion of the core. When the second layer 72 is applied thereon, the edge portion 31 whose radius of curvature has thus been increased is less susceptible to surface tension and can be more easily uniformly applied with the liquid insulating agent sprayed as the second layer. This makes it possible to prevent the coating thickness of the second insulation layer 72 at the edge portion from becoming small, thereby allowing sufficient insulation to be maintained at the edge portion 31 where the insulating effect otherwise tends to deteriorate.

Further, insulation resistance and the withstand voltage can be synergistically improved by using an insulating agent composed of epoxy resin and a ceramic coating agent as the first and second insulation layers 71 and 72, respectively.

Although the insulation layer 7 (the first and second insulation layers 71 and 72) on the surface of the rotor core is formed to have two layers, i.e., an under coat agent and an over coat agent in the embodiment illustrated, any laminated insulation layer is acceptable, and the number of layers is not limited to two but may be increased to three, four and so on.

To form such lamination, the under coat agent (the first insulation layer 71) and the over coat agent (the second insulation layer 72) must be laminated like a sandwich, i.e., alternately laminated, and, importantly, the surface of the rotor core 6 around which the windings are wound is the over coat agent (the second insulation layer 72).

The under coat agent and the over coat agent in a sandwich arrangement is formed by applying each of the liquid insulating agents once or reapplying it a plurality of times within a limit of thickness such that no bubble will be generated.

Since each insulation layer is formed by a liquid insulating agent and is small in coating thickness, even if the number of the insulation layers is increased, the coating thickness of the entire insulation layer will not be larger than that of the conventional insulation layer applied by spraying powdery insulating plastic.

The above-described embodiment is an example of a preferred embodiment of the present invention. However, the present invention is not limited thereto and various modifications are possible without departing the principles of the present invention.

In the case of a large-sized motor, for example, a laminated insulation layer can be formed by reapplying conventional powdery insulating plastic (which has an under coat agent and an over coat agent) a plurality of times.

The laminate-formation makes it possible to eliminate poor insulation and to prevent rust even if bubbles are generated in each layer.

In a core winding set for a motor according to the present invention, an insulation layer on the surface of the core is formed by applying a liquid insulating agent. As a result, the coating thickness of the insulation layer can be made much smaller than that of a conventional insulation layer applied by spraying powdery insulating plastic. Accordingly, it is possible to make the core winding set for a motor and, in addition, the motor itself, thinner.

Further, the insulation layer is formed on the core around which windings are wound by reapplying the liquid insulating agent a plurality of times. As a result, the under coating increases the radius of curvature of an edge portion of the core and, when the over coating is carried out, the edge portion whose radius of curvature has been thus increased is less susceptible to surface tension and can be more easily uniformly applied with the upper liquid insulating agent.

This makes it possible to prevent the coating thickness of the upper liquid insulating agent at the edge portion from becoming small, thereby allowing sufficient insulation to be maintained at the edge portion where the insulating effect otherwise tends to deteriorate.

Further, since the hardness of the insulation layer formed on the surface of the core around which the windings are wound is higher than that of a conventional insulation layer. Therefore, when the windings are wound on the insulation layer, they will not cut into the insulation layer and poor insulation will be thus avoided.

In addition, when the windings are wound on the insulation layer, a winding can be easily moved to a position next to the preceding winding, so that the windings can be easily wound in proper alignment.

While the foregoing description and drawings represent the preferred embodiments of the present invention, it will be obvious to those skilled in the art that various changes and modifications may be made therein without departing from the true spirit and scope of the present invention.

What is claimed is:

1. A core winding set for a motor comprising a core having a plurality of salient poles, an insulation layer formed on a surface of said core, and a winding wound around each of said salient poles on which the insulation layer is formed, said insulation layer being formed by applying a liquid insulating agent, and wherein the liquid insulating agent is composed of a ceramic coating material.

2. A core winding set for a motor according to claim 1 wherein the liquid insulating agent is atomized and applied to the surface of the core.

3. A core winding set for a motor according to claim 1 wherein the liquid insulating agent is also composed of a resin based coating material.

4. A core winding set for a motor according to claim 3 wherein the resin is an epoxy resin.

5. A core winding set for a motor comprising a core having a plurality of salient poles, an insulation layer formed on a surface of said core by repeatedly applying a liquid insulating agent on the surface of said core, and a winding wound around each of said salient poles on which the insulation layer is formed, and wherein the liquid insulating agent is composed of a ceramic coating material.

6. A core winding set for a motor according to claim 5 wherein the liquid insulating agent is also imposed of a resin-based coating material.

7. A core winding set for a motor according to claim 6 wherein the resin is an epoxy resin.

8. A core winding set for a motor comprising a core having a plurality of salient poles, an insulation layer formed by laminating at least two types of liquid insulating materials $\alpha$ and $\beta$ on a surface of said core, and a winding wound around each of said salient poles on which the insulation layer is formed, said liquid insulating material $\alpha$ being composed of a resin-based coating material and said liquid insulating material $\beta$ being composed of a ceramic coating material.

9. A core winding set for a motor according to claim 8 wherein the insulation layer composed of the liquid insulating agent $\alpha$ is formed by repeatedly applying the liquid insulating agent $\alpha$.

10. A core winding set for a motor according to claim 8 wherein the insulation layer composed of the liquid insulating agent $\beta$ is formed by repeatedly applying the liquid insulating agent $\beta$.

11. A core winding set for a motor according to claim 8 wherein the liquid insulating agent $\alpha$ is composed of an epoxy-resin-based coating material.

12. A core winding set for a motor according to claim 11 wherein the insulation layer composed of the liquid insulating agent $\alpha$ is formed by repeatedly applying the liquid insulating agent $\alpha$.

13. A core winding set for a motor comprising a core having a plurality of salient poles, an insulation layer formed by laminating at least two types of liquid insulating materials $\alpha$ and $\beta$ on a surface of said core, and a winding wound around each of said salient poles on which the insulation layer is formed, wherein the liquid insulating agent $\alpha$ is composed of a resin-based coating material and the liquid insulating agent $\alpha$ is composed of a ceramic coating material, and wherein the liquid insulating agent $\alpha$ is used as an under coat agent and the liquid insulating agent $\beta$ is used as an over coat agent.

14. A core winding set for a motor comprising a core having a plurality of salient poles, an insulation layer formed by laminating at least two types of liquid insulating materials $\alpha$ and $\beta$ on a surface of said core, and a winding wound around each of said salient poles on which the insulation layer is formed, and wherein the insulation layer composed of the liquid insulating agent $\alpha$ is formed on the surface of the core; the liquid insulating agent $\alpha$ and the liquid insulating agent $\beta$ are alternately laminated; and the winding is wound around an insulation layer composed of the liquid insulating agent $\beta$.

15. A method of making a core winding set for a motor comprising the steps of:

providing a core having a plurality of salient poles;

forming an insulation layer on a surface of the core by applying a liquid insulating agent; and forming a winding around each of said salient poles on which the insulation layer is formed, and wherein said insulating agent is a ceramic coating material.

16. The method of claim 15 wherein said liquid insulating agent is applied to the surface of the core by atomizing said material.

17. The method of claim 15 wherein said insulating agent is a resin-based coating material.

18. The method of claim 15 wherein said step of forming an insulation layer also includes baking said liquid insulating agent.

* * * * *